United States Patent [19]
Johnson

[11] Patent Number: 5,094,410
[45] Date of Patent: Mar. 10, 1992

[54] CAPTURE/BERTHING SYSTEM FOR SPACECRAFT

[75] Inventor: Caldwell C. Johnson, Dickinson, Tex.

[73] Assignee: Space Industries, Inc., Webster, Tex.

[21] Appl. No.: 429,632

[22] Filed: Oct. 31, 1989

[51] Int. Cl.$^5$ ............................................. B64G 1/64
[52] U.S. Cl. ................................................... 244/161
[58] Field of Search ................. 244/158 R, 159, 161; 166/338, 340, 343, 349; 405/188, 189, 192

[56] References Cited

U.S. PATENT DOCUMENTS

| | | |
|---|---|---|
| 3,391,881 | 7/1968 | Maltby ............................ 244/161 |
| 3,820,741 | 6/1974 | Ratcliff . |
| 3,910,533 | 10/1975 | Cheatham et al. . |
| 4,381,092 | 4/1983 | Barker . |
| 4,391,423 | 7/1983 | Pruett et al. ...................... 244/161 |
| 4,500,057 | 2/1985 | Duwelz . |
| 4,682,745 | 7/1987 | Acres . |
| 4,809,936 | 3/1989 | Whitaker . |
| 4,858,857 | 8/1989 | Lange et al . |
| 4,860,975 | 8/1989 | Schliesing et al. . |
| 4,898,348 | 2/1990 | Kahr ................................. 244/161 |

FOREIGN PATENT DOCUMENTS 1332907 10/1973 United Kingdom .

OTHER PUBLICATIONS

Photograph of a proposed USSR docking system displayed at the Paris Air Show, Summer 1989.
English language translation of a technical and sales brochure on the Universal Androgynous Peripheral Docking Assembly (APDA) provided by the Scientific Commercial Association (NPO), Energyia, for the U.S.S.R. Ministry of General Machine Building (undated).

Primary Examiner—Galen Barefoot
Attorney, Agent, or Firm—Venable, Baetjer and Howard

[57] ABSTRACT

A method and apparatus for joining vehicles such as spacecraft is disclosed that utilizes a capture and berthing technique. The coupling apparatus comprises a first coupling unit having a generally rigid extensible structure that is mountable to a first spacecraft and a second coupling unit having a probe-like structure mountable to a second spacecraft which is cooperable with the extensible structure to effect vehicle coupling. The first and second spacecraft are maneuvered so as to generally align the coupling apparatus thereon, after which the extensible structure is extended to engage and capture the probe-like structure. Following capture of the second coupling unit by the extensible structure, the extensible structure is subsequently retracted to effect berthing of the first and second spacecraft. Once the spacecraft coupling units have been captured and berthed in the foregoing manner, they can be structurally joined by appropriate coupling apparatus.

39 Claims, 6 Drawing Sheets

CAPTURE/BERTHING SYSTEM FOR SPACECRAFT

BACKGROUND OF THE INVENTION

1. Field of the Invention

The present invention relates generally to a method and apparatus for coupling spacecraft, and more particularly to a method and apparatus which combines capture and berthing techniques to effect coupling between spacecraft.

2. Description of the Related Art

Spacecraft coupling apparatus provide a practical way for mechanically joining spacecraft for the logistical support and transfer of crew members between two or more spacecraft, for the mutual support of two or more spacecraft by a sharing of their individual facilities and capabilities, and for the on-orbit repair or assembly and structural expansion of spacecraft. Other on-orbit operations that require spacecraft to be joined include the addition or exchange of modules containing expendable supplies and equipment needed for space-borne experiments and manufacturing processes, the collection of products and byproducts of space-borne experiments and manufacturing processes, and the on-orbit repair and maintenance of spacecraft.

Many of these on-orbit operations can optimally be implemented by crew members moving between the spacecraft through a passage extending between the coupling apparatus of the joined spacecraft. The use of properly designed coupling apparatus for creating a pressurized, shirt-sleeve environment in the passageway between the joined spacecraft is particularly important to the safety of the crew, as the joining of such coupling apparatus can preclude the need for potentially hazardous extravehicular excursions performed by crew members. Furthermore, by eliminating the need for wearing cumbersome space suits when traveling between spacecraft, crew members will be less restricted in their work environment and, therefore, better able to perform a variety of tasks, many of which require the use of a considerable degree of manual dexterity that would otherwise be hindered by the wearing of a cumbersome space suit.

In the past, spacecraft have generally been coupled to one another in one of two ways: docking and berthing. In both processes, the interfacing surface of coupling apparatus carried by respective spacecraft must be fully coupled, or superimposed, by a force supplied to the spacecraft. The processes of docking and berthing differ from one another principally in the manner in which the coupling force is applied to the spacecraft to be joined thereby. In general, a docking process between two spacecraft is initiated by purposefully colliding the spacecraft with one another so as to obtain the necessary coupling force from the relative momentum imparted to both spacecraft by propulsion means such as thrusters on one or both of the spacecraft. In contrast to docking, berthing provides a coupling procedure in which one spacecraft is joined to another by the force and directional control applied by an external positioning system, such as a remotely controllable manipulator arm carried by one of the two spacecraft to be joined.

The use of an external positioning system, such as a remotely controllable manipulator arm, during a berthing process affords a considerable, inherent advantage over docking by virtue of the ability to control various aspects of relative vehicle movement throughout the phases of spacecraft closure and contact. As it is not always possible to position the coupling apparatus of the respective spacecraft to be joined between the centers of gravity of the two spacecraft, the force resulting from the relative motion between the spacecraft incident to a docking procedure can be sufficient to create an undesirable moment about a center axis of either spacecraft and, therefore, cause either spacecraft to "jackknife" and lose axial alignment. The development of such moments can be avoided during berthing due to the relatively lesser forces developed incident to berthing procedures.

Docking procedures can be further disadvantageous for the relative momentum required for superimposing the interfacing surfaces of the respective spacecraft docking apparatus can result in the transmittal of a considerable load to the structures of both spacecraft that support the respective interfacing surfaces. Further, the physical loads imparted to docking spacecraft by relative motion can result in aberrant spacecraft motion. Thus, spacecraft which undergo docking are generally equipped with devices for dampening motion and for structurally reinforcing the spacecraft. Further, the interfacing surfaces themselves must be designed so as to withstand the forces created by the relative momentum of the docking spacecraft. For all of the foregoing reasons, the configuration of a spacecraft to accommodate coupling by way of docking results in an appreciably greater degree of overall complexity and weight as opposed to spacecraft that are configured to accommodate coupling by way of berthing.

While the structures of berthing spacecraft are exposed to generally lighter physical loads than those of docking spacecraft, the external positioning system used with berthing spacecraft can present disadvantages because of its complexity. External positioning equipment such as robotic arms are generally remotely controlled and must be designed with a sufficient range of motion so as to permit the equipment to attain proper alignment in order to grasp the target object. However, the design, development and implementation of a device which has sufficient mobility and tactility maneuver to grasp a target is both time consuming and expensive.

SUMMARY OF THE INVENTION

The coupling apparatus of the present invention is characterized in that it is used in a coupling procedure which combines capture and berthing processes. During a capture process, one of the coupling apparatus designated as the "active" coupling apparatus is selectively displaceable with respect to the other of the coupling apparatus and is operable so as to extend outwardly to engage a generally fixedly mounted ("passive") coupling apparatus secured to the other spacecraft. The active coupling apparatus is subsequently operable to retract, thus controllably bringing the spacecraft together, after which the spacecraft can be structurally joined in a berthing process. Prior to extension of the active coupling apparatus, the spacecraft are maneuvered until they are positioned relative to each other in a desirable orientation. The active coupling apparatus is selectively operable so as to extend toward and engage the coupling apparatus of the other spacecraft once proper alignment is achieved and relative motion between spacecraft is within acceptable limits. Once the active coupling apparatus has engaged the passive coupling apparatus of the other spacecraft, the two spacecraft can be brought together by retracting the extended coupling apparatus. Because the two spacecraft are maintained at relatively stationary positions with respect to one another during the coupling process, and the respective coupling apparatus are arranged such that an "active" apparatus is selectively extensible and retractable with respect to the coupling apparatus attached to the other of the two spacecraft, the coupling apparatus of both spacecraft are subjected to a considerably smaller physical load than that which is imparted by the relative motion of spacecraft during a conventional docking procedure. The reduction of loads imparted to the coupling apparatus and the simplicity thereof allows for the use of relatively lightweight coupling apparatus, thereby affording a considerable benefit in increased reliability and payload handling capacity of the spacecraft.

BRIEF DESCRIPTION OF THE DRAWINGS

Further details and advantages of the spacecraft capture and berthing system of the subject invention will become apparent from a review of the following detailed description when read in conjunction with the accompanying drawings, in which.

DETAILED DESCRIPTION OF THE PREFERRED EMBODIMENTS

Figure 1:
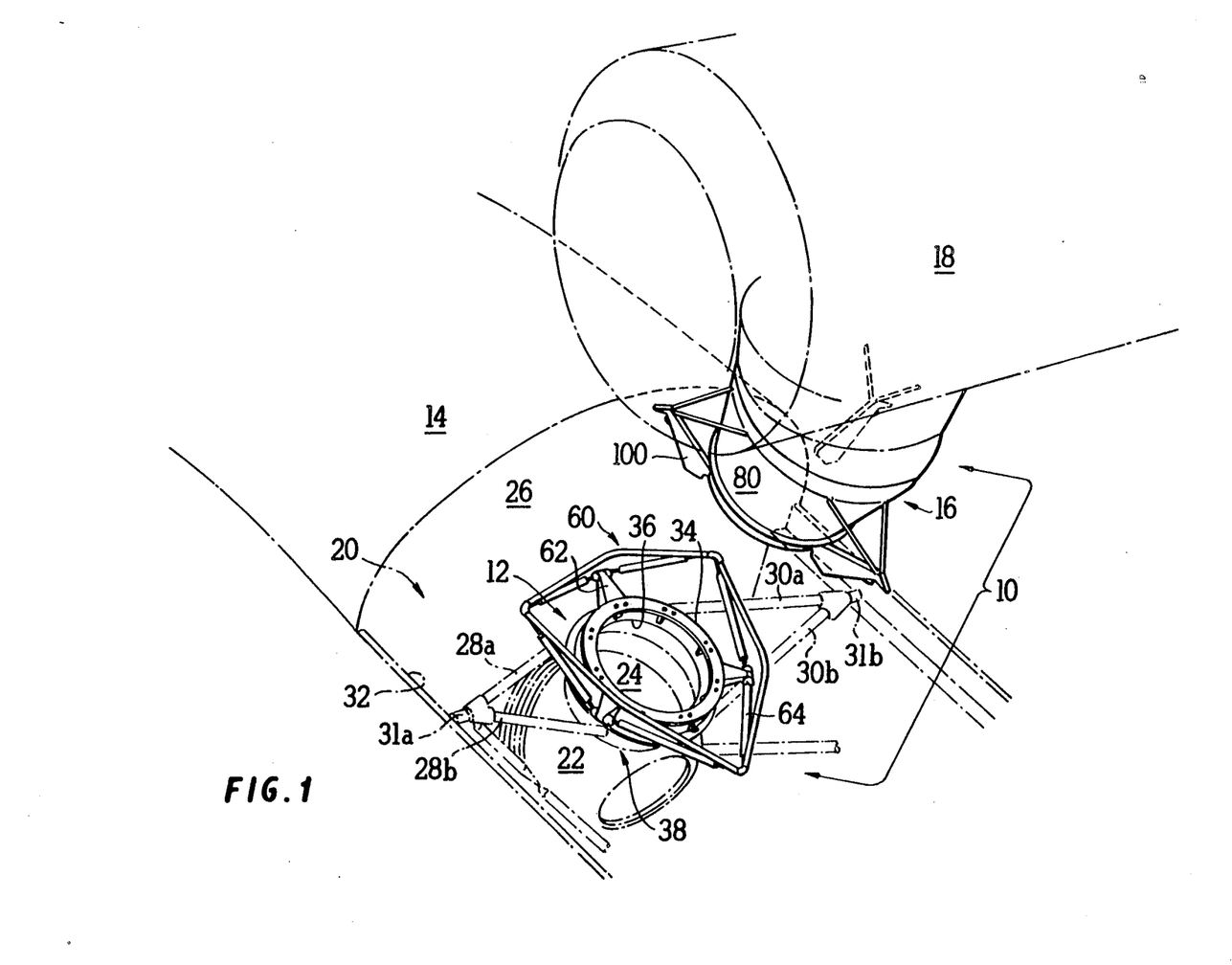
FIG. 1 is a pictorial view of an embodiment of the invention illustrating first and second coupling apparatus attached to two separate spacecraft at the onset of spacecraft coupling.

With reference to the drawings, wherein like reference characters represent like components throughout the various views, and with particular reference to FIG. 1, there is depicted a coupling apparatus, designated generally by reference numeral 10, constructed in accordance with the present invention. The coupling apparatus permits advantageous aspects of both vehicle capture and berthing procedures to be incorporated into a novel coupling procedure for joining spacecraft together. As will be discussed in more detail below in connection with the description of the illustrated embodiment, the coupling apparatus offers many structural as well as procedural advantages over conventional docking and berthing hardware.

The coupling apparatus 10 comprises a first coupling unit, designated generally by reference numeral 12, that is attachable in a conventional manner to a first spacecraft 14 that is cooperable with a second coupling unit, designated generally by reference numeral 16, which is attached to a second spacecraft 18. It is envisioned that the coupling apparatus of the invention may be used to permit coupling between the Space Transportation System (also referred to as the Space Shuttle Orbiter) developed in the United States by the National Aeronautics and Space Administration (NASA) and free-flying spacecraft such as the proposed NASA Space Station and the proposed Industrial Space Facility being developed by Space Industries, Inc., the assignee of the subject patent application. Although the coupling apparatus is not restricted to use with the above-mentioned spacecraft, the first coupling unit 12 is shown in FIG. 1 as being secured within the cargo bay area 20 of the Space Shuttle Orbiter 14 by a lower unit 22. The lower unit 22 defines a passageway 24 that extends from a portal (not shown) formed in the cabin bulkhead 26 of the spacecraft to the first coupling unit 12. The lower unit 22 is supported within the cargo bay area 20 by opposed pairs of struts 28a, 28b and 30a, 30b that extend from the lower unit 22 to the sidewalls 32 of the cargo bay 20 and are pivotably attached thereto by corresponding trunnions 31a, 31b. The first coupling unit 12, however, is adaptable so as to be secured to the exterior surface of a spacecraft.

In the following description of the components of coupling apparatus 10 depicted in FIGS. 1 and 2, the first coupling unit 12 will be referred to as the lower coupling unit in accordance with the orientation of the two spacecraft shown in FIG. 1, and the second coupling unit 16 will be referred to as the upper coupling unit.

Figure 2:
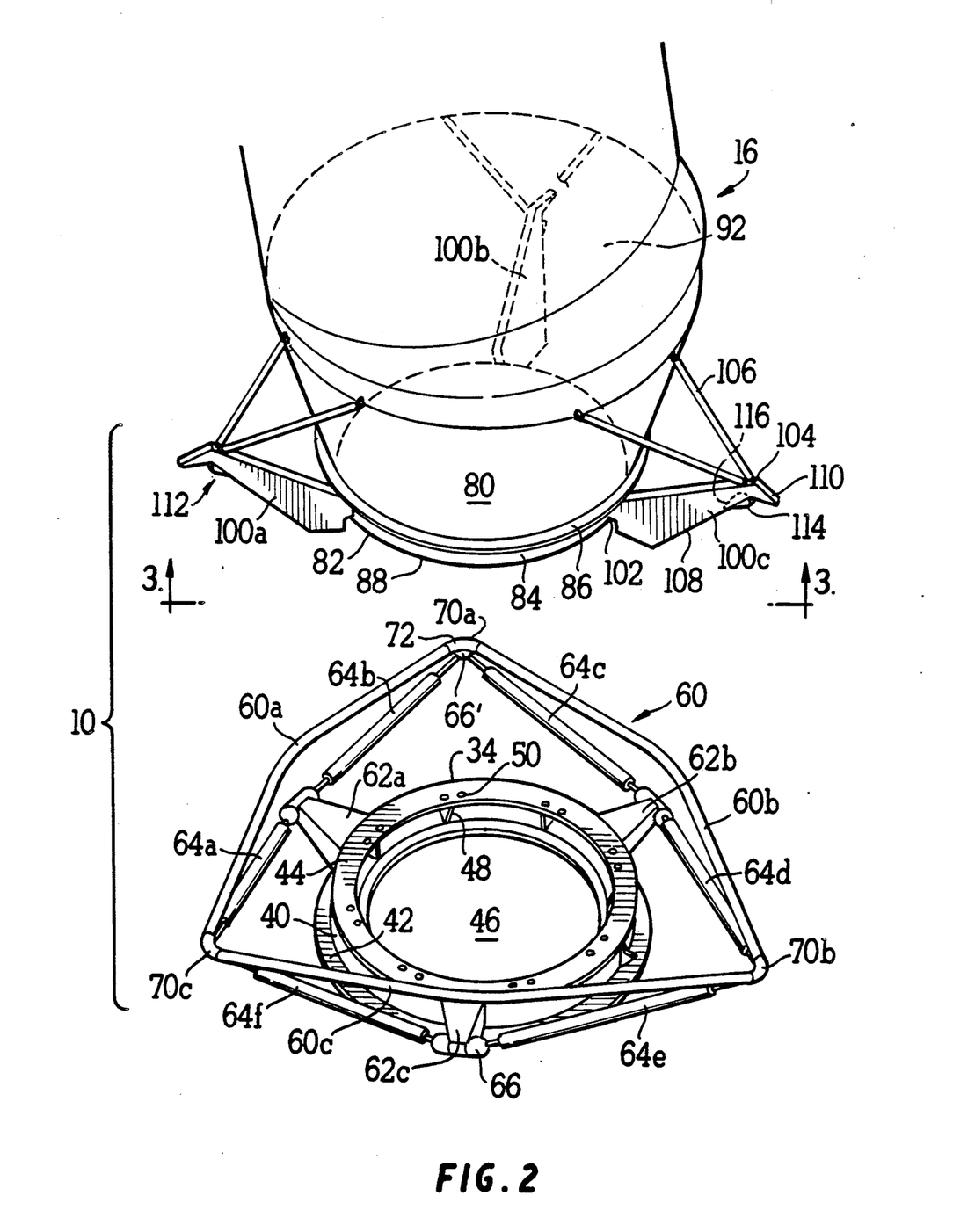
FIG. 2 is an enlarged view of the first and second coupling apparatus depicted in FIG. 1.

With reference to FIGS. 1 and 2, the lower coupling unit 12 comprises a rigid ring assembly 34 which is mountable to an annular aperture 36 formed at the upper end 38 of the lower unit 12. Alternatively, the ring assembly 34 can be secured to an external surface of a spacecraft 14, as noted previously.

The ring assembly 34 is analogous to the ring structure disclosed in my co-pending U.S. patent application Ser. No. 313,497 filed on Feb. 22, 1989 and entitled "Spacecraft Berthing Mechanism With Discrete Impact Attenuation Means" and includes a peripheral flange 40 having a lower rim 42 and an upper interface surface 44 that is coupleable to a corresponding interface surface of the second (upper) coupling unit 16 in the manner described in detail below. The peripheral flange 40 defines a ring aperture 46 that is appropriately dimensioned to permit the passage therethrough of spacecraft personnel and supplies. The aperture 46, as well as the flange 40, can be provided with any of a variety of configurations, such as a generally polyhedral configuration or the generally annular configuration as shown in the drawings. A plurality of support brackets 48 are positioned between the interface surface 44 and lower rim 42 to maintain these respective surfaces in a predetermined spatial relationship, as shown in the drawings. A plurality of apertures 50 is formed in the interface surface 44 to permit the passage therethrough of suitable coupling hardware such as bolts and the like to effect structural joining of juxtaposed coupling units. The apertures 50 are preferably arranged in pairs with a bracket 48 interpositioned therebetween.

The ring assembly 34, in conjunction with other hardware discussed below, supports a rigid, generally triangular hoop-like extensible structure, designated generally by reference numeral 60, that is selectively extensible and retractable in the manner described in detail below to engage the second (upper) coupling unit and draw it toward the first (lower) coupling unit incident to spacecraft coupling. The generally triangular configuration of the extensible structure 60 affords a significant advantage of the coupling apparatus of the subject invention over conventional docking and berthing mechanisms, for the shape of the hoop is helpful in obtaining proper clocking (rotational) alignment of the respective coupling apparatus of the spacecraft to be joined. The attainment of proper clocking alignment is an important factor to address when attempting to bring together spacecraft which are to be structurally joined. The manner in which proper clocking alignment is attained in the subject coupling system is discussed in more detail below in connection with the operation of the disclosed coupling system.

With particular reference to FIG. 2, the ring 34 is provided with a plurality of support brackets, designated 62a, 62b, 62c that are mounted equidistantly to the outer periphery of the ring 34 and which extend radially outward therefrom. The distal end of a pair of struts 64 is mounted to the distal end of each bracket 62a through 62c. As the currently preferred ring configuration provides for three outwardly-extending ring brackets, a total of six struts, designated by reference characters 64a through 64f, is provided for the coupling unit. The struts 64a through 64f extend generally transversely from their corresponding bracket and are pivotably joined thereto by a ball joint 66. The end of each strut 64 opposite a corresponding ball joint 66 is pivotably joined to another ball joint 66' that is mounted to a corresponding one of the apices 70a, 70b and 70c of the triangular structure 60. An open-ended tubular sleeve 72 can be provided at each apex 70a through 70c to receive and couple the extensible structure to the struts 64. In the preferred embodiment, the extensible structure 60 is arranged so as to be assembleable from three tubular sections, designated 60a, 60b and 60c in FIG. 2, upon coupling of the sections with the sleeve 72. However, other arrangements, such as configuring the extensible structure as a unitary member, are also encompassed by the subject invention.

The lower coupling unit 12 and the upper coupling unit 16 are configured so as to be mutually engageable to effect spacecraft coupling. The upper coupling 16 generally comprises a tubular, probe-like structure 80 that is secured at one end thereof to the second spacecraft 18 at a spacecraft portal (not shown). As shown in FIG. 1, the probe 80 is provided with a generally elongated, cylindrical configuration that is angled so as to extend from the spacecraft 18 at a predetermined angle to facilitate coupling with the lower unit 12 carried by the first spacecraft. However, it is to be understood that the probe configuration is not to be limited to that depicted in the drawings. Instead, the probe can be configured so as to be, for example, straight, curvalinear, or multiply angled in accordance with the type and configuration of the spacecraft to which it is to be mounted and to which it is to engage. The free end of the probe 80 that is opposite the end secured to the spacecraft 18 is provided with a ring assembly 82 that is substantially similar to the ring assembly 34 of the first (lower) coupling unit 12. The ring assembly 82 of the probe 80 includes a peripheral flange 84 having a rim 86 and an interface surface 88 positioned opposite of the rim 86 that is configured so as to be coupleable to the interface surface 44 of the lower coupling unit 12. The probe ring assembly 82 defines a ring aperture 90 (FIG. 3) that is dimensioned so as to correspond in size and shape to the ring aperture 46 of the lower coupling unit 12 to permit the passage therethrough of spacecraft personnel and supplies. The ring aperture 90 is aligned with a probe passageway 92 to provide access between the ring assembly 82 and the spacecraft 18. Apertures 94 are provided along the ring interface 88 at positions corresponding to the positions of the apertures 50 of the lower ring assembly 34 to provide for the passage therethrough of appropriate coupling hardware, such as that disclosed in my previously-cited copending patent application, U.S. Ser. No. 313,497.

Figure 3:
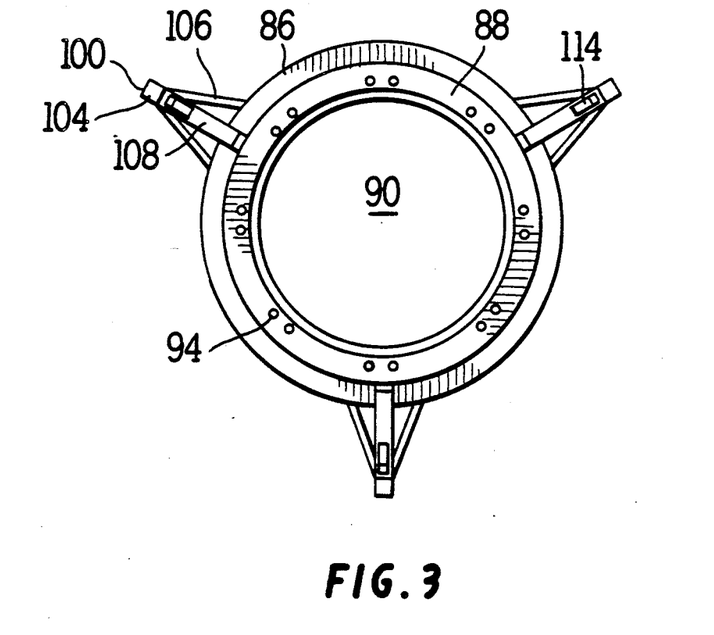
FIG. 3 is a view along the line 3—3 of FIG. 2.

With particular reference to FIGS. 2 and 3, the probe 80 of the present invention is provided with an arrangement of three extensible structure-engaging arms 100a, 100b and 100c that are equidistantly mounted along the outer periphery of the probe and extend generally radially outwardly therefrom. Each of the arms 100a through 100c is provided with a generally elongated structure and comprise a first end 102 which is secured adjacent the free end of the probe 80 and a second, free end 104. A pair of rigid, elongated reinforcing members 106 extend between the probe and the free end 104 of each arm 100 to support the arms at their respective free ends. The arms 100 have a generally trapezial configuration that tapers toward the free end 104 of the arm. The distal surface 108 of the arm defines a cam surface along which the extensible structure 60, and more particularly the apices 70 thereof, are adapted to slidably pass.

The free end 104 of each of the arms 100a through 100c is integrally formed with an angularly extending retaining member 110. The retaining members 110 are oriented so as to extend generally transversely from the free end of the probe 80 to prevent passage of the extensible structure 60 beyond a predetermined position along the respective arms 100a through 100c, as is described in greater detail below.

A retractable latch assembly 112 is positioned adjacent the free end 104 of each arm along the distal, camlike surface 108 of the respective arm. The latch assembly 112 can be of conventional design of a type having a pivotably mounted latch arm 114 arranged to be received within a correspondingly-dimensioned recess 116 formed in the engaging arm 100. The latch arm is preferably biased toward the depicted, outwardly-extending position by appropriate biasing means such as resilient spring means and the like. Means such as electromechanical biasing means is provided to selectively retract the latch arm 114 within recess 116 to provide the distal, cam-like surface of the extensible structure engaging arm with a generally smooth, flat surface along its length between its proximal and free ends 102, 104, respectively.

The procedure for joining the two spacecraft 14 and 18 will now be described. Prior to coupling of the spacecraft 14 and 18, the spacecraft are positioned relative to one another to obtain optimal radial, axial and clocking alignment of the coupling units 12 and 16 carried by the respective spacecraft. In the preferred embodiment of the invention, one of the two spacecraft 14, 18 is maintained at a substantially fixed position in space relative to the other of the two spacecraft. For illustrative purposes, the second spacecraft 18 will be considered as being in a substantially stationary position in its orbit throughout the following description. The first (lower) spacecraft 14 is maneuvered so as to position the coupling unit 12 mounted thereon into proximity with the coupling unit 16 that is secured to the second spacecraft 18. With reference to FIG. 1, the first spacecraft 14 is shown to be approaching the second spacecraft 18 from the underside thereof. This depicted approach is undertaken in view of the respective mounting positions of the coupling units 12 and 16 on their respective spacecraft. It is to be understood, however, that the spacecraft coupling units can be positioned at other sites of the respective spacecraft and that the approach of the spacecraft relative to one another can vary from that depicted in FIG. 1 in accordance with such coupling unit placement. The following description, however, will pertain to the relative spacecraft and coupling unit arrangement depicted in FIGS. 1 and 2, with the implicit understanding that persons of ordinary skill in the art of spacecraft coupling will comprehend the nature of variations in the following coupling sequence that may be necessary to accommodate spacecraft of different design and coupling unit placement therein.

Figures 4, 5:
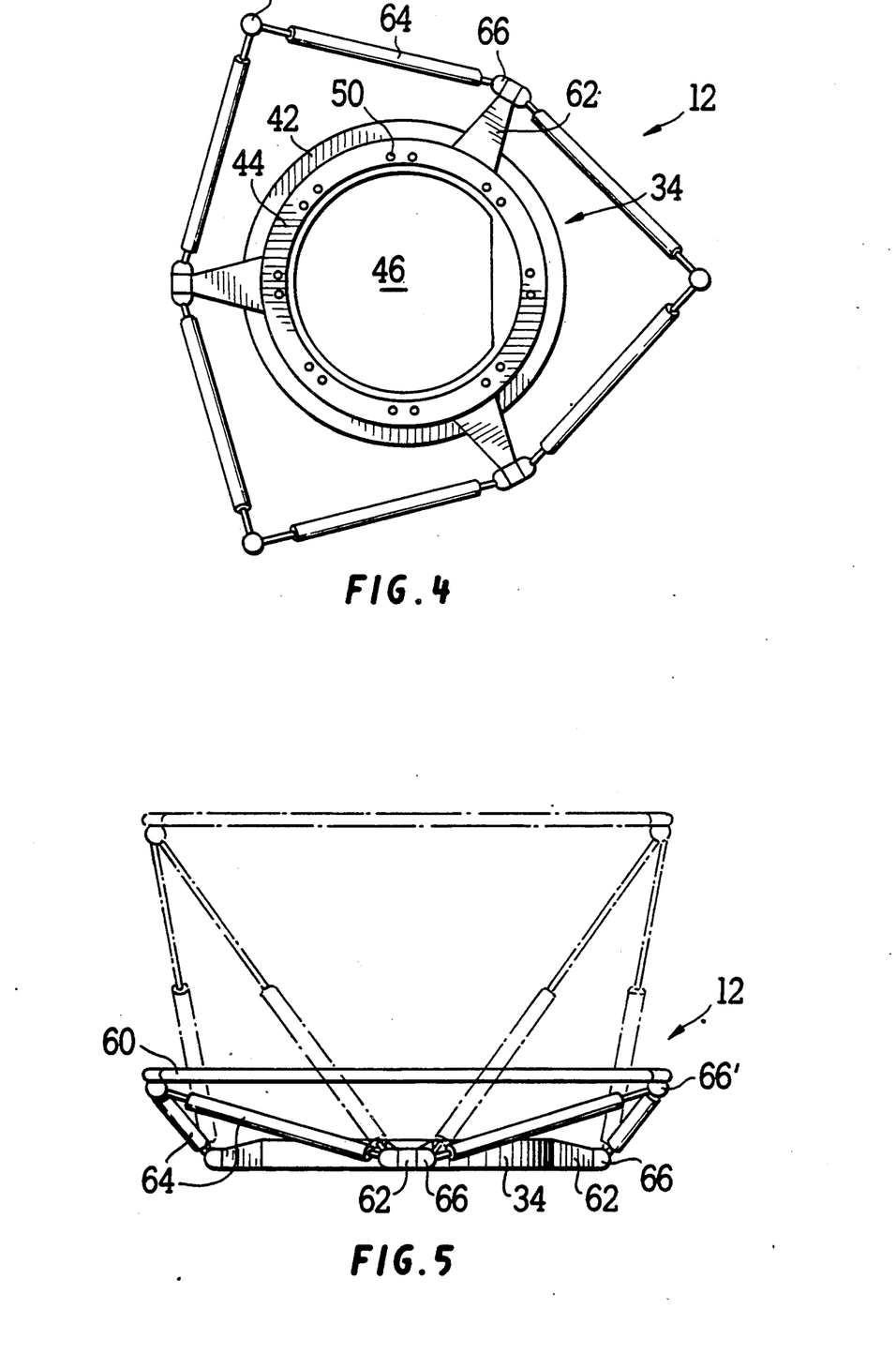
FIG. 4 is a top view of a first coupling apparatus shown in FIG. 2 with certain parts removed for clarity.
FIG. 5 is a side view of the coupling apparatus shown in FIG. 3 depicting the coupling apparatus in retracted and extended positions.
Figure 6:
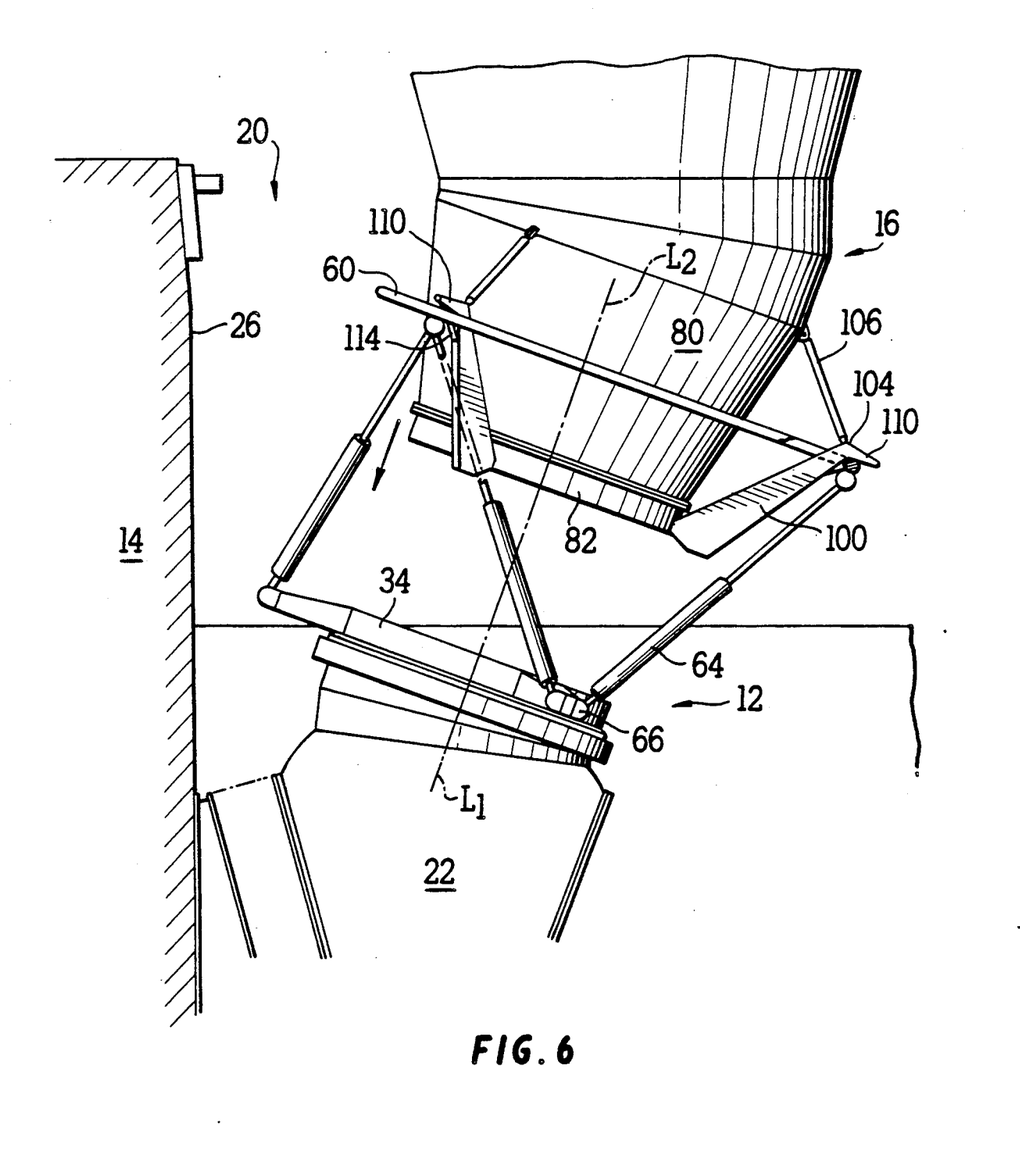
FIGS. 6 and 7 illustrate a side view of first and second coupling apparatus at the onset and completion of spacecraft coupling.
Figure 7:
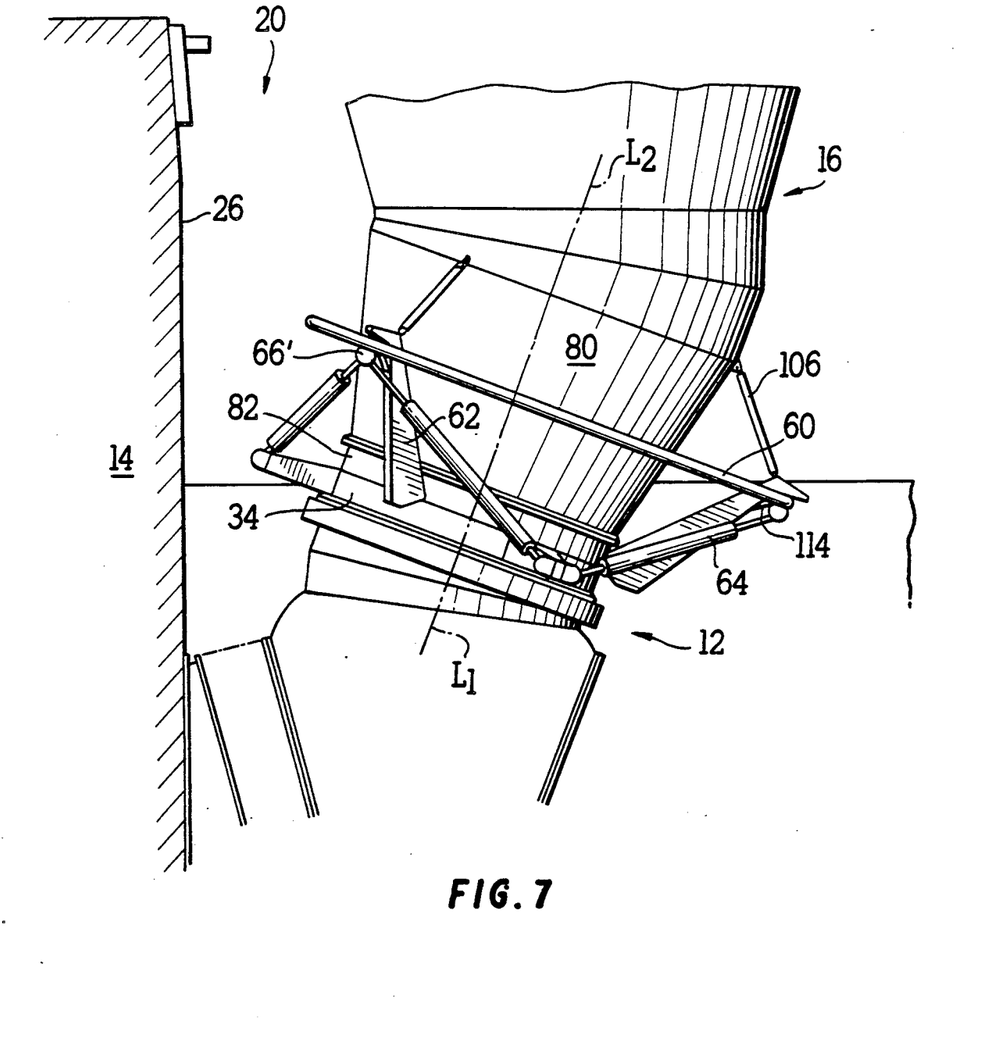

With reference to FIGS. 5 through 7, the lower spacecraft 14 is maneuvered relative to the second spacecraft 18 prior to spacecraft coupling so as to achieve an optimal degree of axial, clocking and radial alignment of the coupling units 12 and 16 in order that the coupling units will be superimposable once spacecraft coupling is initiated. Throughout the coupling procedure, the lower spacecraft 14 will be maneuvered so as to maintain the lower coupling unit 12 at approximately a predetermined, generally fixed orientation and separation distance with respect to the upper coupling unit 16, and to generally achieve coaxial alignment between a longitudinal axis $L_2$ of the free end of the elongated probe 80 and the longitudinal axis $L_1$ of the ring assembly 34 of the first coupling unit 12. The spacecraft are positioned such that the coupling units are optimally separated from one another by a distance that is sufficiently great to provide clearance between the spacecraft to permit for the correction of aberrant spacecraft maneuvering, yet small enough to allow the lower coupling unit 12 to extend and capture the upper coupling unit 24 in a capture procedure described below. Optimal clocking alignment is attained when the apices 70a, 70b and 70c are positioned opposite the corresponding extensible structure-engaging arms 100a, 100b and 100c.

The spacecraft capture procedure, which is a preliminary step of the overall spacecraft coupling procedure of the subject invention, is initiated when the coupling units 12 and 16 are aligned with one another in the manner described above, but are separated from one another by a distance falling within a prescribed range of distances, and relative motion between spacecraft 14 and 18 is within acceptable limits. The capture procedure is executed by the first (lower) coupling unit 12, and more particularly, the hoop-like extensible structure 60 thereof. For this reason, the lower unit can be regarded as an "active" coupling unit, whereas the second coupling unit, which maintains a fixed spatial relationship with respect to the spacecraft 18 to which it is attached, can be regarded as a "passive" coupling unit. With reference to FIGS. 4 and 5, the hoop is reciprocably extensible and retractable with respect to the ring assembly 34 between a retracted position, depicted by the solid lines in FIG. 5, and an extended position, depicted in phantom in FIG. 5. Displacement of the extensible structure is accomplished by the selective operation of the struts 64a through 64f coupling the extensible structure 60 to the ring assembly 34. Each of the struts is preferably of the type having a compressible spring that can be manipulated between a compressed and expanded state by appropriate control means. However, other types of extendable and retractable struts, such as fluid actuated struts, can be substituted for the spring struts described above. Prior to the execution of a capture procedure, the struts 64a through 64f are arranged in a compressed state so as to reduce their longitudinal dimension. The compressed struts and, therefore, the extensible structure 60, lie generally within the plane of the ring 34, as shown in FIG. 5.

The struts 64a through 64f can be selectively and simultaneously released from their compressed state so as to release their spring force and increase in length. The rate at which the struts increase in length can be controlled by appropriate braking or friction means, if desired. As the struts 64 release their spring force and expand, the struts pivot about ball joints 66, 66', so as to extend the extensible structure 60 outwardly from the ring assembly 34 along a generally linear path to the extended position depicted in phantom in FIG. 5. As the extensible structure 60 is extended in this manner, it engages the engaging arms 100 of the second (passive) coupling unit 16, as shown in FIG. 6, with its respective extensible structure apices 70a, 70b and 70c riding along the cam-like distal edges 108 of the corresponding extensible structure engaging arms 100a, 100b and 100c. As the apices slide toward the free end 104 of the respective structure-engaging arms, the apices engage and depress the latch arm 114 of each latch assembly into its corresponding latch recess 116. Once the apices have advanced along the engaging arms 100 beyond the latch assemblies thereof, the latch arms are extended outwardly by appropriate biasing means from their respective recesses so as to inhibit rearward movement of the extensible structure 60, i.e., movement of the extensible structure away from the free end 104 of the engaging arms 100 toward the probe ring assembly 82. Movement of the extensible structure 60 beyond a predetermined position along the respective engaging arms is inhibited by the angularly extending retaining members 110 mounted at the distal, free end of each engaging arm. Once the extensible structure 60 has attained a position situated between the latch assembly 112 and retaining member 110 of each engaging arm, the capture process is regarded as having been accomplished, thus enabling initiations of the berthing phase of the spacecraft coupling procedure.

Because radial, axial and clocking alignment of the coupling units 12 and 16 is achieved prior to initiation of the capture process by extension of the struts 64a through 64f, the apices 70a, 70b and 70c are aligned with and slide along the cam-like distal edges of the corresponding, opposed engaging arms 100a through 100c as the struts 64 increase in length. Minor deficiencies in clocking and radial alignment can be corrected upon extension of the extensible structure 60 and engagement of the extensible structure with the cam-like surfaces 108 of the engaging arms 100. The pivotal connection of the extensible structure 60 with respect to the ring 34, which is provided by the ball joints 66, permits the independent rotation of the extensible structure in response to forces exerted thereon resulting from improper engagement of the extensible structure with the engaging arms 100. The manner in which the engaging arms 100 extend radially outwardly from the periphery of the probe 88 generally permits a greater degree of rotation of the extensible structure 60 when the extensible structure 60 is situated adjacent the secured ends 102 of the arms 100 than is permitted when the extensible structure is situated adjacent the free ends 104 of the arms 100. Minor misalignment between the extensible structure and the structure engaging arms 100 can, therefore, be self-corrected as the extensible structure advances along the arms 100 toward the free ends 104 thereof, because the extensible structure 60 can independently rotate with diminishing freedom as the apices 70 therefore are guided into alignment with the arms 100 by the outwardly extending cam-like surfaces 108 of the arms 100.

In the event the apices 70a, 70b and 70c cannot obtain proper alignment with their corresponding extensible structure engaging arms 100a, 100b and 100c, the struts 64 can be operated so as to decrease in length to withdraw the extensible structure assembly toward the retracted position depicted by the solid lines in FIG. 5, after which the first spacecraft 14 can be maneuvered to correct for the coupling unit misalignment. It is important to note that, since the mass of the extensible structure 60 and the moving parts of the struts 64 are very small relative to the overall mass of the two spacecraft, the momentum resulting from the movement of the extensible structure 60 and the struts 64 is not consequential to the spacecraft themselves. Unlike docking, wherein failure to couple the spacecraft can result in substantial disturbance of the attitude of either spacecraft, the attitudes of the spacecraft utilizing the vehicle coupling system of the subject invention are not substantially disturbed should the extensible structure 60 fail to capture the probe 80. In the event the coupling units 12 and 16 are misaligned to a extent that is not self-correctable upon advancement of the extensible structure 60 along the probe arms 100, and at least a portion of the extensible structure has advanced beyond the latch assembly 112 of at least one of the arms 100, all or selected ones of the latch assemblies can be operated so as to retract the latch arm 114 thereof to permit the withdrawal of the extensible structure therefrom and the correction of the coupling unit misalignment, as by further maneuvering the respective spacecraft in the manner described above.

Upon completion of the capture phase of the spacecraft coupling procedure, whereby the extensible structure 60 is extended and secured or locked in position at the periphery of the probe arms 100 by the extended latches 114 and the retaining members 110, the berthing phase of spacecraft coupling is commenced. The berthing phase is initiated by retraction of the struts 64, thereby causing the struts to decrease in length and the extended extensible structure 60 and engaged probe 80 to advance toward the ring assembly 34 of the first coupling unit. As the struts 64 return to a state of compression, they will generally vary in terms of their overall length. Nevertheless, they generally assume a position along the plane of the ring assembly 34. While state of the art technology can provide each strut 64 with the ability to determine its own length and to compute how much to retract, a simpler way to control the retraction of the struts 64 is to simultaneously command all struts 64 to extend to their limit at the same rate, and to simultaneously command all struts 64 to retract at the same rate. Once the struts 64 have been retracted, thereby bringing the ring assembly 82 of the probe 80 into superposition with the ring assembly 34 of the lower coupling unit 12, as shown in FIG. 7, the respective coupling units 12 and 16 can be structurally joined or secured by, for example, extending bolts through the respective ring apertures 50 and 94 so as to engage appropriate bolt retaining hardware at the other of the ring assemblies from which the bolts are extended.

The coupling apparatus and procedure of the present invention represents both structural and procedural advantages over conventional spacecraft docking and berthing techniques. For example, by providing the coupling system as set forth above, whereby the two spacecraft to be joined are substantially aligned prior to initiation of the coupling process by capture of a spacecraft by the active coupling apparatus of the other spacecraft, a low momentum and, therefore, a low impact approach is established between the two spacecraft to be joined. This low impact approach precludes the need for structurally reinforced and generally bulky, heavy and complex coupling apparatus which have heretofore been required to withstand the momentum resulting from the motion of both spacecraft in, for example, a conventional docking procedure, whereby spacecraft coupling is accomplished as a result of the kinetic energy imparted to docking apparatus carried by the respective spacecraft by one or both of the spacecraft to be joined. Further, the present invention precludes the need for shock absorption devices generally employed by docking mechanisms to dampen some of the residual motion after a docking procedure, as the coupling arrangement of the subject invention does not rely upon the kinetic energy imparted by one of the spacecraft in order to effect spacecraft coupling.

The arrangement of mutually engageable coupling apparatus of the present invention represents a further simplification of conventional coupling systems which utilize external positioning devices such as robotic arms carried by one of the spacecraft to be joined, as no such external positioning system is required. By providing a coupling system in which the respective spacecraft coupling apparatus are substantially aligned prior to the commencement of spacecraft coupling, the number and complexity of the coupling apparatus parts, as well as their functions, can be reduced considerably, thereby further reducing both the design as well as the implementation costs for the system.

While the invention has been described above in connection with various preferred embodiment, it is to be expressly understood that further variations and changes to the preferred embodiment that may occur to persons of ordinary skill in the fields of aerospace engineering and vehicle coupling are meant to fall within the scope of the accompanying patent claims.

What is claimed is:

1. An apparatus for coupling a first vehicle with a second vehicle, comprising:
   a first coupling unit comprising a ring assembly mountable to the first vehicle, means extensible from said ring assembly, and means mounted to the periphery of said ring assembly for reciprocably extending said extensible means between an extended position and a retracted position; and
   a second coupling unit mountable to the second vehicle for coupling with said first coupling unit, said second coupling unit comprising a generally cylindrical rigid probe extending outwardly from the second vehicle and having means mounted thereon for engagement and capture by said first coupling unit extensible means upon sliding advancement of said extensible means therealong.

2. The apparatus according to claim 1, wherein said first coupling unit extensible means comprises a generally rigid extensible member which defines an aperture for receiving said probe.

3. The apparatus to claim 2, wherein said extensible member is provided with a generally triangular configuration having three apices.

4. The apparatus according to claim 2, wherein said probe means for capturing said extensible member comprises an array of engagement arms positioned along said probe in a configuration generally complementary to the configuration of said extensible member.

5. The apparatus according to claim 4, wherein at least one of said engagement arms comprises means for guiding said extensible member into a predetermined orientation with respect to said engagement arms.

6. The apparatus according to claim 5, wherein said guiding means comprises a distal edge of at least one of said engagement arms.

7. The apparatus according to claim 4, wherein said extensible member is provided with a plurality of sides that correspond in number to the number of extensible member engagement arms mounted to said probe.

8. The apparatus according to claim 4, wherein the extensible member is provided with a generally triangular configuration and said engagement arms are positioned along the probe in a generally triangular configuration complementary to the configuration of said extensible member, at least one of said engagement arms being provided with means for directing the apices of the generally triangular extensible member into a generally opposed orientation with a corresponding one of said engagement arms.

9. The apparatus according to claim 4, wherein at least one of said engagement arms comprises extensible member retaining means formed at a distal, free end of the engagement arm.

10. The apparatus according to claim 4, wherein at least one of said engagement arms comprises latch means for retaining said extensible member on said engagement arm.

11. The apparatus according to claim 10, wherein said latch means is selectively retractable from said engagement arm.

12. The apparatus according to claim 1, wherein said means for reciprocably extending said first coupling unit extensible means comprises at least one strut that is coupled at one end to the ring assembly and at a second, opposite end to the extensible means.

13. The apparatus according to claim 1, wherein said means for reciprocably extending said first coupling unit extensible means is selectively operable to displace said extensible means between the extended and retracted positions.

14. The apparatus according to claim 13, wherein said means for reciprocally extending said extensible means is operable to displace said first coupling unit toward said probe following capture thereof by said first coupling unit.

15. The apparatus according to claim 14, wherein said second coupling unit further comprises a ring assembly coupleable with the ring assembly of said first coupling unit.

16. The apparatus according to claim 15, wherein at least one of said ring assemblies defines a ring aperture dimensioned to receive the passage of supplies therethrough.

17. The apparatus according to claim 15, wherein each of the ring assemblies of the first and second coupling units defines a ring aperture, said ring apertures being alignable so as to provide a passageway extending between the first and second coupling units.

18. The apparatus according to claim 1, wherein said extensible means is generally coplanar with respect to said ring assembly when said extensible means is in the retracted position.

19. An apparatus for effecting coupling between a first vehicle and a second vehicle spaced apart from the first vehicle; comprising:
a first vehicle coupling unit comprising a ring assembly defining a ring aperture dimensioned to receive the passage of vehicle crew members therethrough, said ring assembly being mountable to the first vehicle, a generally rigid, open-ended member selectively extensible from said ring assembly and defining a generally cylindrical aperture, and means for selectively displacing said extensible member relative to said first coupling unit between an extended and a retracted position; and
a second vehicle coupling unit comprising an open-ended, generally cylindrical rigid probe extending outwardly from said second vehicle and having a plurality of generally rigid engagement arms mounted thereto for engagement and capture by said first coupling unit extensible member upon sliding advancement of said extensible member therealong.

20. The apparatus according to claim 19, wherein said extensible member is provided with a plurality of sides that correspond in number to the number of engagement arms mounted to said probe.

21. The apparatus according to claim 20, wherein at least one of said engagement arms comprises means for guiding said extensible member into a predetermined orientation with respect to said engagement arms.

22. The apparatus according to claim 21, wherein said guiding means comprises a distal edge of at least one of said engagement arms.

23. The apparatus according to claim 19, wherein the extensible member is provided with a generally triangular configuration and said engagement arms are positioned along the probe in a generally triangular configuration complementary to the configuration of said extensible member, at least one of said engagement arms being provided with means for directing the apices of the generally triangular extensible member into a generally opposed orientation with a corresponding one of said engagement arms.

24. The apparatus according to claim 19, wherein at least one of said engagement arms comprises latch means for retaining said extensible member on said engagement arm.

25. The apparatus according to claim 24, wherein said latch means is selectively retractable from said engagement arm.

26. The apparatus according to claim 19, wherein said means for selectively extending said extensible member comprises at least one strut that is coupled at one end to said first coupling unit ring assembly and at a second, opposite end to the extensible member.

27. The apparatus according to claim 26, wherein said at least one strut is coupled to said ring assembly through a support bracket extending generally radially outwardly from said ring assembly.

28. The apparatus according to claim 26, wherein at least one strut is operable to displace said probe following probe capture toward said ring assembly.

29. The apparatus according to claim 28, wherein said second coupling unit comprises a second ring mounted at a distal, free end of said probe.

30. The apparatus according to claim 29, wherein said second ring assembly defines a ring aperture that is generally alignable with and superposable over said ring aperture of said first coupling unit.

31. The apparatus according to claim 19, wherein said first coupling unit is coupled to said first vehicle through an intermediary lower unit.

32. The apparatus according to claim 31, wherein said lower unit defines a passageway that is in fluid communication with said aperture of said first ring assembly.

33. A method for coupling first and second vehicles, each of the vehicles having mutually engageable coupling apparatus mounted thereon, the method comprising the steps of:

positioning the first and second vehicles such that their respective coupling apparatus are generally aligned with one another and are spatially separated by a generally fixed, predetermined distance;

extending a generally rigid extensible member from the periphery of the first coupling apparatus toward a generally cylindrical probe of the second coupling apparatus;

sliding said extensible member along a fixed, rigid probe surface member;

engaging and capturing the second coupling apparatus with said generally rigid extensible member upon advancement of said member beyond a predetermined position along said probe surface member;

retracting the generally rigid extensible member and second vehicle coupling apparatus captured thereby toward said first coupling apparatus; and superposing said second coupling apparatus over said first coupling apparatus.

34. The method according to claim 33, further comprising the step of structurally joining said first and second coupling apparatus.

35. The method according to claim 33, wherein said first coupling apparatus is rotatably alignable with said second coupling upon engagement with said second coupling apparatus.

36. The method according to claim 33, further comprising the step of releasing the captured second coupling apparatus, re-aligning the respective coupling apparatus, and re-engaging and capturing the second coupling apparatus.

37. The method according to claim 33, wherein said step of engaging and capturing the second coupling apparatus comprises further the step of depressing latch means carried by said second coupling unit.

38. The method according to claim 37, wherein said latch means is selectively retractable so as to release said extensible member.

39. The method according to claim 33, wherein said step of second coupling apparatus engagement and capture comprises advancing said generally rigid extensible member along an outer surface of the second coupling apparatus.

* * * * *